United States Patent [19]

Nishimura

[11] Patent Number: 4,984,753
[45] Date of Patent: Jan. 15, 1991

[54] TAPE CASSETTE

[75] Inventor: Shigehiro Nishimura, Mito, Japan

[73] Assignee: Victor Company of Japan, Ltd., Japan

[21] Appl. No.: 425,257

[22] Filed: Oct. 23, 1989

[30] Foreign Application Priority Data

Oct. 24, 1988 [JP] Japan .......................... 63-138496[U]

[51] Int. Cl.⁵ .......................... G03B 1/04; G11B 15/32
[52] U.S. Cl. .................................... 242/199; 242/197; 242/76
[58] Field of Search .............. 242/197, 198, 199, 200, 242/76; 360/132; 226/194

[56] References Cited

U.S. PATENT DOCUMENTS

| | | | |
|---|---|---|---|
| 3,337,147 | 6/1965 | Soong et al. | 242/197 |
| 3,819,131 | 6/1974 | Inaga | 242/199 |
| 4,015,790 | 4/1977 | Gelardi et al. | 242/197 X |
| 4,175,719 | 11/1979 | Speckman et al. | 242/197 |
| 4,515,330 | 5/1985 | Wulfing et al. | 242/197 |
| 4,518,134 | 5/1985 | Oishi et al. | 242/199 |
| 4,575,023 | 5/1986 | Komiyama | 242/199 |

Primary Examiner—William A. Cuchlinski, Jr.
Assistant Examiner—Joseph A. Rhea
Attorney, Agent, or Firm—Lowe, Price, LeBlanc, Becker & Shur

[57] ABSTRACT

A tape cassette includes a cantilevered reel shaft and an annular reinforcement wall which are integrally molded with a cassette body member in concentric relation to one another. When a reel hub rotatably supported on the reel shaft is subjected to a lateral impact or shock force tending to bend the reel shaft, the reinforcement wall engages an inner bearing wall of the reel hub to limit the deformation of the reel shaft within a elastic limit of the reel shaft.

10 Claims, 4 Drawing Sheets

TAPE CASSETTE

BACKGROUND OF THE INVENTION

1. Field of the Invention

The present invention relates to a tape cassette having a reel hub journaled on a reel shaft.

2. Background of the Prior Art

Tape cassettes containing separate supply and take-up reels that link a length of narrow magnetic recording tape are widely used. The known tape cassettes are generally classified into two groups according to the manner in which a reel hub is supported. The tape cassettes classified in a first group include a reel hub adapted to be supported on and driven by a shaft of an external drive unit. On the other hand, the tape cassettes of a second group have an internal or built-in reel shaft rotatably supporting thereon a reel hub. The second group of tape cassettes includes a take-up reel of VHS-C video tape cassettes ("VHS-C" is the trademark of Victor Co. of Japan, Ltd.).

A conventional take-up reel of the VHS-C type video tape cassettes generally includes, as shown in FIGS. 5 and 6 of the accompanying drawings, a reel hub 2 molded of a synthetic resin and having a generally cylindrical outer wall 2a for winding therearound a magnetic tape (not shown) and a cylindrical inner bearing wall 2b concentric with the outer wall 2a and having a central bearing hole 2c. The outer wall 2a is partly offset so as to form an arcuate clamp wall 2d defining an arcuate recess 2e for receiving therein a tape clamp (not shown) for fastening one end of the magnetic recording tape to the reel hub. The outer wall 2a and the clamp wall 2d are joined with the inner bearing wall 2b by a plurality of radial reinforcement ribs 2f.

The take-up reel hub 2 of the foregoing construction is rotatably supported on a reel shaft 3 which projects perpendicularly from the bottom wall of a molded cassette body 1 as shown in FIG. 7. The reel shaft 3 is made of metal and secured to the bottom wall of the molded cassette body 1 by means of a locking pin 4 press-fitted into an axial central hole 3a in the reel shaft 3 through a hole 1a in the bottom wall.

The tape-up reel hub supporting structure of the foregoing construction is composed of a relatively large number of component parts and hence the conventional VHS-C type video tape cassettes are costly to manufacture.

To cope with this difficulty, the reel shaft 3 may be integrally molded with the bottom wall of the cassette body 1. In this instance however a satisfactory result cannot be obtained because an integrally molded reel shaft having the same diameter as the conventional one, such as 3 mm, is not resistant to a lateral force applied thereto in a direction perpendicular to the axis of the reel shaft. Accordingly, the reel shaft is likely to be damaged or broken when subjected to an impact or shock force imposed thereon for instance when the user unintentionally drops the tape cassette. In the case of an integrally molded reel shaft having a diameter greater than 3 mm, the bottom wall of the cassette body tends to have a sink mark in the vicinity of the reel shaft. With this sink mark the perpendicularity of the reel shaft is considerably deteriorated. Furthermore, the contact surface area between the reel shaft and the bearing hole of the reel hub increases with the diameter of the reel shaft with the result that the reel hub while being rotated is subjected to an increased friction resistance and hence tends to cause a running failure.

SUMMARY OF THE INVENTION

With the foregoing drawbacks in view, it is an object of the present invention to provide a tape cassette which provides a substantial reduction of manufacturing cost, has a high impact strength and dimensional accuracy, and is reliable in operation.

In brief, a tape cassette according to the present invention includes a reel shaft and an annular reinforcement wall which are integrally molded with a cassette body member in concentric relation to one another. When a reel hub rotatably supported on the reel shaft is subjected to a lateral impact or shock force tending to bend the reel shaft, the reinforcement wall engages an inner bearing wall of the reel hub to limit the deformation of the reel shaft within an elastic limit of the reel shaft. With the reinforcement wall thus provided, it is no longer necessary to increase the diameter of the reel shaft in such a manner as to sustain the lateral impact. Accordingly, the tape cassette is free from a running failure which would otherwise be caused by a large frictional resistance resulting from an increased contact surface area between the reel shaft and the inner bearing wall. Furthermore, the reel shaft and the reinforcement wall integrally molded with the cassette body member are accurate in size and shape and hence enable the reel hub to rotate stably and reliably. With this integrally-molded structure, the tape cassette has a relatively small number of component parts and hence can be manufactured at a low cost.

According to the present invention, there is provided a tape cassette comprising: a cassette body molded of a synthetic resin and having an internal space defined therein; a reel shaft integrally molded with the cassette body and extending perpendicularly from an inner surface of the cassette body into the internal space; a reel hub rotatably supported on the reel shaft and having an cylindrical inner bearing wall and a generally cylindrical outer tape-retaining wall joined concentrically with the inner bearing wall for winding therearound a magnetic recording tape, the inner bearing wall having a central bearing hole receiving therein said reel shaft; and a tubular reinforcement wall integrally molded with the cassette body in concentric relation to the reel shaft and loosely fitted around the inner bearing wall.

The above and other objects, features and advantages of the present invention will become more apparent from the following description with reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The present invention will be described hereinbelow in greater detail with reference to a preferred embodiment shown in FIGS. 1 through 4 of the accompanying drawings.

Figure 1:
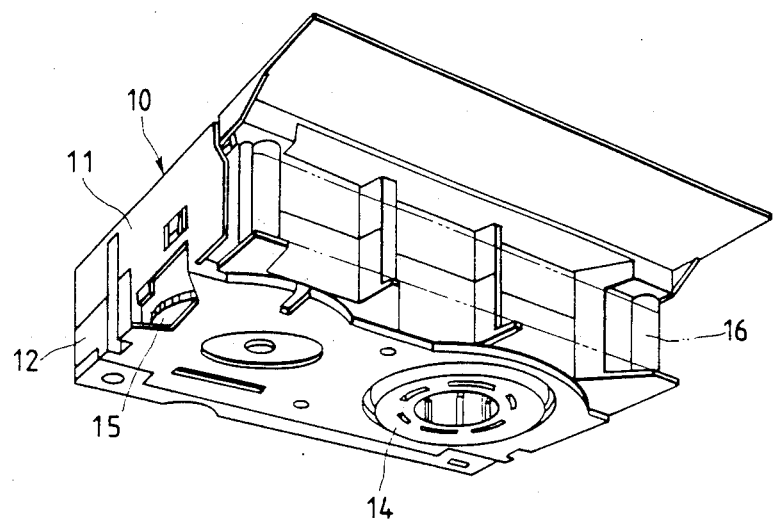
FIG. 1 is a perspective view of a VHS-C video tape cassette according to the present invention.

FIG. 1 shows a VHS-C type video tape cassette embodying the present invention. The tape cassette includes a cassette body 10 composed of an upper body half or member 11 and a lower body half or member 12 assembled together to hold therein a supply reel 14 and a take-up reel 15 which, respectively, wind and unwind a length of magnetic recording tape 16 while the tape passes an external recording and/or playback head, not shown.

Figure 2:
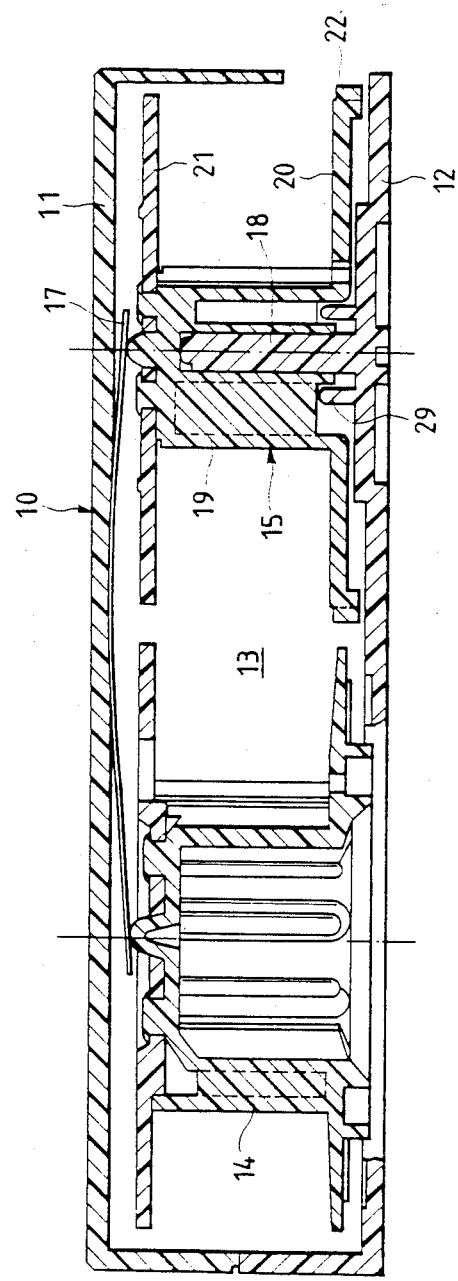
FIG. 2 is an enlarged longitudinal cross-sectional view of the tape cassette.

As shown in FIG. 2, the upper and lower cassette body members 11, 12 are molded of a synthetic resin and define therebetween a hollow interior space 13 in which the supply and take-up reels 14, 15 are disposed. The supply reel 14 and the take-up reel 15 are urged toward the lower body member 12 by a leaf spring 17 secured to an inner surface of the upper body member 11, so that both reels 14, 15 are floatingly received in the cassette body 10. The lower body member 12 includes a reel shaft 18 formed of synthetic resin and molded integrally with the lower body member 12. The reel shaft 18 actually has a diameter of 3 mm and extends perpendicularly from an inner surface of the lower body member 12 for rotatably supporting thereon the take-up reel 15. Note that reel shaft 18 is of cantilever form, i.e., it is supported only at the end at which it is integral with the lower body member 12. See FIGS. 1–4. The take-up reel 15 includes a reel hub 19 having at integral flange 20 at its lower end, and an annular flange 21 attached to an upper end of the reel hub 19. The flange 20 has a toothed outer peripheral edge 22 with which a pinion of an external drive means (not shown) meshes for rotating the take-up reel 15.

Figure 3:
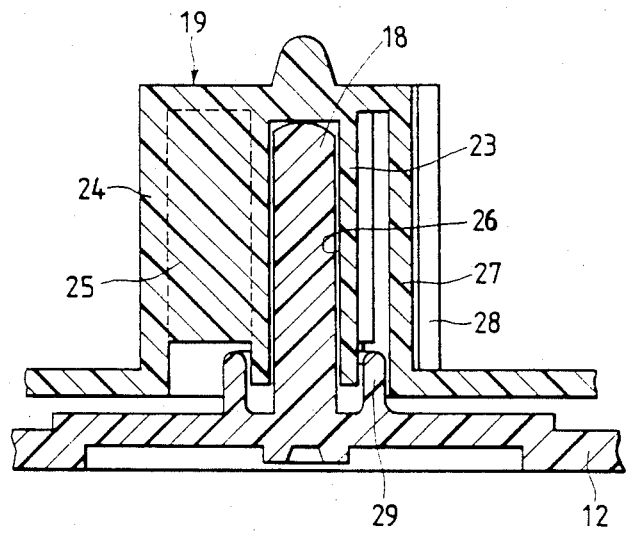
FIG. 3 is an enlarged cross-sectional view of a portion of a take-up reel of the tape cassette shown in FIG. 2.
Figure 5:
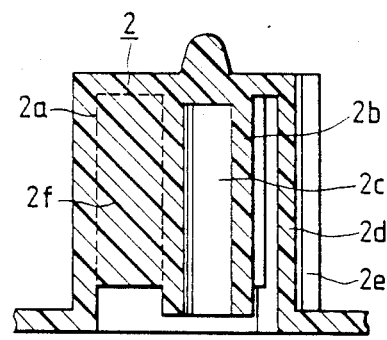
FIG. 5 is a cross-sectional view of a portion of a reel hub of a take-up reel of a conventional VHS-C video tape cassette.
Figure 6:
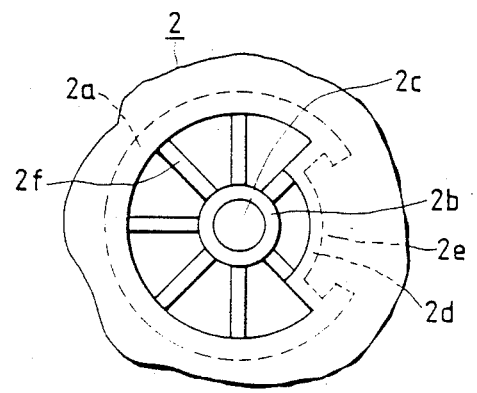
FIG. 6 is a bottom view of FIG. 5.
Figure 7:
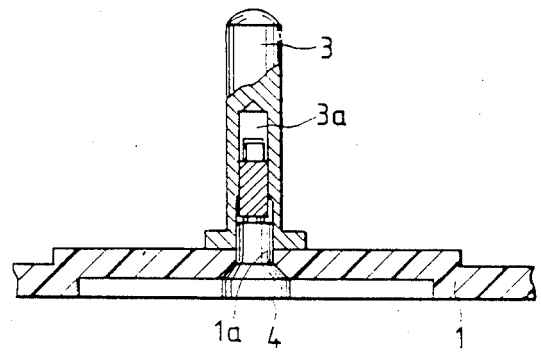
FIG. 7 is a partial cross-sectional view of a reel shaft of the conventional tape cassette.

The flanged reel hub 19, as shown in FIG. 3, has a generally double-tube structure including a cylindrical inner bearing wall 23 journaled on the reel shaft 18, and a generally cylindrical outer tape-retaining wall 24 for winding therearound the magnetic recording tape 16 (FIG. 1). The outer tape-retaining wall 24 is concentric with the inner bearing wall 23 and joined with the inner bearing wall 23 by a plurality of radial reinforcement ribs 25 (only one shown). The inner bearing wall 23 has a central bearing hole 26 fitted over the reel shaft 18, with a clearance not exceeding 0.1 mm defined between the bearing hole 26 and the reel shaft 18. The outer tape-retaining wall 24 is partly offset inwardly so as to form an arcuate clamp wall 27 (identical with the clamp wall 2d shown in FIGS. 5 and 6) defining an arcuate recess 28 for receiving therein a clamp (not shown) to firmly holding an end of the magnetic recording tape on the reel hub 19.

The lower body member 12 includes an annular reinforcement wall 29 formed integrally therewith in concentric relation to the reel shaft 18 and extending circumferentially around a lower portion of the inner bearing wall 23 of the reel hub 19, with a first clearance defined between the inner bearing wall 23 and the reinforcement wall 29. The first clearance is not less than 0.1 mm so as to keep the inner bearing wall 23 out of contact with the reinforcement wall 29 while the reel hub 19 is rotating. Likewise, the reinforcement wall 29 is spaced from the clamp wall 27 with a second clearance defined therebetween. The second clearance is not less than 0.1 mm so that the clamp wall 27 does not interfere with the reinforcement wall 29 during the rotation of the reel hub 19. The reinforcement wall 29 molded of synthetic resin is resiliently deformable to absorb an impact or shock force exerted on the reel shaft 18 in a direction perpendicular to the axis of the reel shaft 18. With this shock-absorbing property in view, the first and second clearances are kept within respective appropriate ranges, in a manner as described below.

Figure 4:
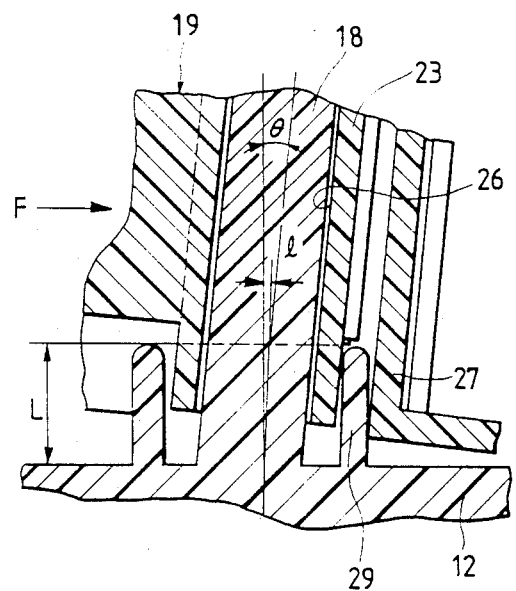
FIG. 4 is a view similar to FIG. 3, but showing a portion of the take-up reel on enlarged scale when it is subjected to a force applied in a direction perpendicular to the axis of the take-up reel.

As shown in FIG. 4, when the reel hub 19 is subjected to a lateral impact or shock force F acting in a direction (rightward in this figure) perpendicular to the axis of the reel shaft 18, the reel shaft 18 molded of synthetic resin is resiliently flexed rightward by bending at the end at which reel shaft 18 is integral with lower body member 12. This resilient deformation of the reel shaft 18 causes the inner bearing wall 23 of the reel hub 19 to engage the reinforcement wall 29 and then force the reinforcement wall 29 to resiliently deform outwardly. With this resilient deformation of the reinforcement wall 29, a part of the lateral shock force is absorbed. Alternately, in the case where the direction of a shock force exerted on the reel hub 19 is opposite to the direction of the shock force F shown in FIG. 4, the clamp wall 27 and a portion of the inner bearing wall 23 which is diametrically opposite to the clamp wall 27 are brought into engagement with diametrically opposite portions of the annular reinforcement wall 29. The reinforcement wall 29 resiliently deforms leftward to thereby absorb a portion of the shock force. With the reinforcement wall 29 thus provided, the reel shaft 18 is capable of withholding a lateral impact or shock force so long as the shock force is not exceeding an elastic limit of the synthetic resin constituting the reel shaft 18 and the reinforcement wall 29.

If the elastic limit of the synthetic resin is given in terms of a maximum angle $\theta$ of inclination of the unbent length of the reel shaft 18, as determined with respect to its unloaded/unbent axis, the breakage of the reel shaft 18 does not take place when the reinforcement wall 29 engages the inner bearing wall 23 and/or the clamp wall 27 before the reel shaft 18 is bent beyond the inclination angle $\theta$. Accordingly, an allowable maximum deformation or lateral displacement l of the reel shaft 18 measured at the front end of the reinforcement wall 29 is indicated by the following equation, i.e., of the distal end of reel shaft 18 with respect to its unloaded/unbent axis (1).

$$l = L \cdot \tan \theta \tag{1}$$

where L is a height of the reinforcement wall 29.

Thus, the above-mentioned first and second clearances (S1 and S2) respectively between the inner bearing wall 23 and the reinforcement wall 29 and between the reinforcement wall 29 and the clamp wall 27 are obtained by the following inequalities (2) and (3).

$$0.1 \text{ mm} < S1 < L \cdot \tan \theta \tag{2}$$

$$0.1 \text{ mm} < S2 < L \cdot \tan \theta \tag{3}$$

Since the reinforcement wall 29 is integrally molded with the lower body member 12 and the reel shaft 18, the first and second clearances can be easily maintained within the above-mentioned appropriate ranges.

Obviously various minor changes and modifications of the present invention are possible in the light of the above teaching. It is therefore to be understood that within the scope of the appended claims the invention may be practiced otherwise than as specifically described.

What is claimed is:

1. A tape cassette, comprising:
    a cassette body molded of a synthetic resin and formed to have an internal space defined therein;
    a cantilevered reel shaft integrally molded with said cassette body and extending from an inner surface of said cassette body into said internal space to be perpendicular to said inner surface when not subjected to a lateral load;
    a reel hub rotatably supported on said reel shaft, said reel hub having a cylindrical inner bearing wall having an inner cylindrical surface and an outer cylindrical surface and a generally cylindrical outer tape-retaining wall joined concentrically with said inner bearing wall for winding there around a magnetic recording tape, said inner cylindrical surface of said inner bearing wall forming a central bearing hole shaped and sized to rotatably receive said cantilevered reel shaft therein; and
    a tubular reinforcement wall integrally molded with said cassette body in concentric relation to said cantilevered reel shaft and loosely fitted around said inner bearing wall, said reinforcement wall being shaped and sized to be engageable with said outer cylindrical surface of said inner bearing wall to limit a bending of said cantilevered reel shaft when said cantilevered reel shaft is subjected to a lateral force.

2. A tape cassette as claimed in claim 1, wherein;
    said reinforcement wall is radially spaced from said inner bearing wall with a predetermined first clearance selected so that said reel shaft is bendable within an elastic limit of said synthetic resin forming said reel shaft when the reel shaft is subjected to said lateral force.

3. A tape cassette as claimed in claim 2, wherein;
    said outer tape-retaining wall is partly offset inwardly so as to form an arcuate clamp wall defining an arcuate recess, and said reinforcement wall has a peripheral portion that loosely fits between said inner bearing wall and said clamp wall with a predetermined second clearance and is engageable with said clamp wall to limit a bending of said reel shaft when the reel shaft is subjected to said lateral force.

4. A tape cassette as claimed in claim 3, wherein;
    said first and second clearances are each not less than 0.1 mm.

5. A tape cassette as claimed in claim 1, wherein;
    said reinforcement wall is formed to be resiliently deformable to absorb a part of a lateral force tending to bend said reel shaft.

6. A tape cassette as claimed in claim 5 wherein;
    said reinforcement wall is radially spaced from said inner bearing wall with a predetermined first clearance selected so that said reel shaft is bendable within an elastic limit of said synthetic resin forming said reel shaft when the reel shaft is subjected to said lateral force.

7. A tape cassette as claimed in claim 6, wherein;
    said outer tape-retaining wall is partly offset, inwardly so as to form an arcuate clamp wall defining an arcuate recess, and said reinforcement wall has a peripheral portion that loosely fits between said inner bearing wall and said clamp wall with a predetermined second clearance and is engageable with said clamp wall to limit a bending of said reel shaft when the reel shaft is subjected to said lateral force.

8. A tape cassette as claimed in claim 7, wherein;
    said first and second clearances are each not less than 0.1 mm.

9. A tape cassette as claimed in claim 5, wherein;
    said outer tape-retaining wall is partly offset inwardly so as to form an arcuate clamp wall defining an arcuate recess, and said reinforcement wall has a peripheral portion that loosely fits between said inner bearing wall and said clamp wall with a predetermined second clearance and is engageable with said clamp wall to limit a bending of said reel shaft when the reel shaft is subjected to said lateral force.

10. A tape cassette as claimed in claim 1, wherein;
    said outer tape-retaining wall is partly offset inwardly so as to form an arcuate clamp wall defining an arcuate recess, and said reinforcement wall has a peripheral portion that loosely fits between said inner bearing wall and said clamp wall with a predetermined second clearance and is engageable with said clamp wall to limit a bending of said reel shaft when the reel shaft is subjected to said lateral force.

* * * * *